(12) United States Patent
Tobisawa

(10) Patent No.: US 6,192,783 B1
(45) Date of Patent: Feb. 27, 2001

(54) BRAKE BOOSTER

(75) Inventor: Yoshio Tobisawa, Saitama-Ken (JP)

(73) Assignee: Jidosha Kiki Co., Ltd., Tokyo (JP)

( * ) Notice: Subject to any disclaimer, the term of this patent is extended or adjusted under 35 U.S.C. 154(b) by 0 days.

(21) Appl. No.: 09/354,378

(22) Filed: Jul. 14, 1999

(30) Foreign Application Priority Data

Aug. 28, 1998 (JP) .................................................. 10-243340

(51) Int. Cl.$^7$ ....................................................... F15B 9/10
(52) U.S. Cl. ............................................................. 91/369.2
(58) Field of Search ............................... 91/369.2, 369.3, 91/376 R

(56) References Cited

U.S. PATENT DOCUMENTS

| 3,548,595 | * | 12/1970 | Pech et al. ........................... | 91/369.3 |
| 5,699,713 | * | 12/1997 | Mortimer ............................. | 91/369.2 |
| 5,794,506 | * | 8/1998 | Inoue et al. ......................... | 91/369.2 |

FOREIGN PATENT DOCUMENTS 7-8337    3/1995   (JP) .

* cited by examiner

Primary Examiner—F. Daniel Lopez
(74) Attorney, Agent, or Firm—Flynn, Theil, Boutell & Tanis, P.C.

(57) ABSTRACT

A brake booster which permits a booster ratio to be changed in two stages. A first spring 25 is disposed between a first plunger plate 24 and the bottom of a stowage 8A of a valve plunger 8. Toward its front end, the outer periphery of the first plunger plate 24 slidably extends through a second plunger plate 26, which is in turn located at its inoperative position shown by a second spring 28 having a greater spring constant than the first spring 25. When the brake booster 1 is actuated, a reaction disc 33 which bulges rearward initially abuts against the first plunger 24, and subsequently, as the first spring 25 is compressed, it abuts against the end faces of the both plunger plates 24, 28. If a brake pedal is released under this condition, a hysteresis is substantially nullified. The invention provides an improved brake controllability in a region of a greater depression (or input) of the brake pedal.

2 Claims, 2 Drawing Sheets

BRAKE BOOSTER

FIELD OF THE INVENTION

The invention relates to a brake booster, and more particularly, to a brake booster which is constructed in a manner to permit a brake ratio to be changed in two stages.

DESCRIPTION OF THE PRIOR ART

A brake booster is known in the art which comprises a valve body slidably disposed within a shell, a valve plunger slidably fitted into the valve body and coupled to an input shaft for movement therewith, a first plunger plate slidably fitted into a front tubular portion of the valve plunger, a first spring for urging the first plunger plate forwardly relative to the valve plunger, and a reaction disc interposed between one end of an output shaft and an end face of the valve body for transmitting a reaction which is acting on the output shaft through the first plunger plate and the first spring to the valve plunger and the input shaft (see, for example, Utility Model Publication No. 8337/1995).

In the conventional booster mentioned above, in the inoperative condition of the brake booster, the front end face of the first plunger plate slightly projects forwardly of the front end face of the valve plunger. When the brake booster is actuated, a reaction which is acting on the output shaft causes the reaction disc to bulge, thus causing it to abut against the front end face of the first plunger plate. Subsequently, as the reaction increases to compress the first spring, the reaction disc abuts against the first plunger plate and the end face of the valve plunger. As a consequence, an output rises with a greater booster ratio under the condition that the reaction disc abuts against only the first plunger plate, and the output rises with a reduced booster ratio under the condition that the reaction disc abuts against both the first plunger plate and the valve plunger. In this manner, a conventional arrangement permits a booster ratio to be changed in two stages corresponding to a region of a reduced and a greater depression of a brake pedal (input).

It is known in a brake booster that there exists a hysteresis, meaning a difference in the input between when a brake pedal is depressed and when it is released for an output of an equal magnitude. In the conventional booster mentioned above, the hysteresis occurs not only in a greater booster ratio region, but also in a smaller booster ratio region or in a region where the depression applied to a brake pedal is greater.

However, the presence of a hysteresis in a region where the depression of the brake pedal is greater results in fact that a driver feels that the controllability of a brake is uncomfortable. Accordingly, when a brake booster is premised in which a booster ratio can be changed in two stages, it is desired for the brake booster that the hysteresis be substantially equal to null in a region where the depression of the brake pedal is greater.

SUMMARY OF THE INVENTION

In view of the foregoing, the present invention provides a brake booster of the type initially mentioned in which an annular, second plunger plate is slidably fitted around the outer periphery of the first plunger plate at its front end, and a second spring having a greater resilience than the first spring is disposed between the second plunger plate and the valve plunger, so that in the inoperative condition of the brake booster, the front end face of the second plunger plate is located rearward of the front end face of the first plunger plate, such that as the brake booster is actuated, in a region of a smaller depression of the brake pedal, the reaction disc is brought into abutment against the front end face of the first plunger plate to allow a reaction acting upon the output shaft to be transmitted to the valve plunger through the first plunger plate and the first spring and in a region of a greater depression of the brake pedal, the reaction disc is brought into abutment against the front end faces of the both plunger plates to allow a reaction which is acting upon the output shaft to be transmitted to the valve plunger through the both plungers and the first and the second spring.

With this arrangement, as the brake booster is actuated, a reaction which is acting upon the output shaft causes the reaction disc to bulge rearwardly, initially abutting against the front end face of the first plunger plate. An output rises with a greater booster ratio under this condition.

Subsequently, as the depression applied to the brake pedal increases to cause an increase in the reaction, the first spring is compressed, whereupon the reaction disc abuts against the second plunger plate also, in addition to against the first plunger plate. The output rises with a reduced booster ratio from this point on.

In a region where the output rises with a reduced booster ratio as mentioned above, or in a region where the depression applied to the brake pedal is greater, as the brake pedal is released from depression, the reaction disc operates in a manner such that a fluid circuit is switched by a valve mechanism which is mechanically coupled to the valve plunger, thus immediately causing a reduction in the output. However, because the second plunger plate and the valve plunger are mechanically coupled together through the second spring by this time, the input cannot be reduced until the reaction disc which has bulged rearward is restored forwardly. Accordingly, in a region where the output rises with a reduced booster ratio, it follows that the hysteresis is substantially null.

In this manner, a brake controllability can be improved in a region of a greater depression (or input) of the brake pedal.

Above and other objects, features and advantages of the invention will become apparent from the following description of an embodiment thereof with reference to the attached drawings.

DETAILED DESCRIPTION OF THE EMBODIMENT

Figure 1:
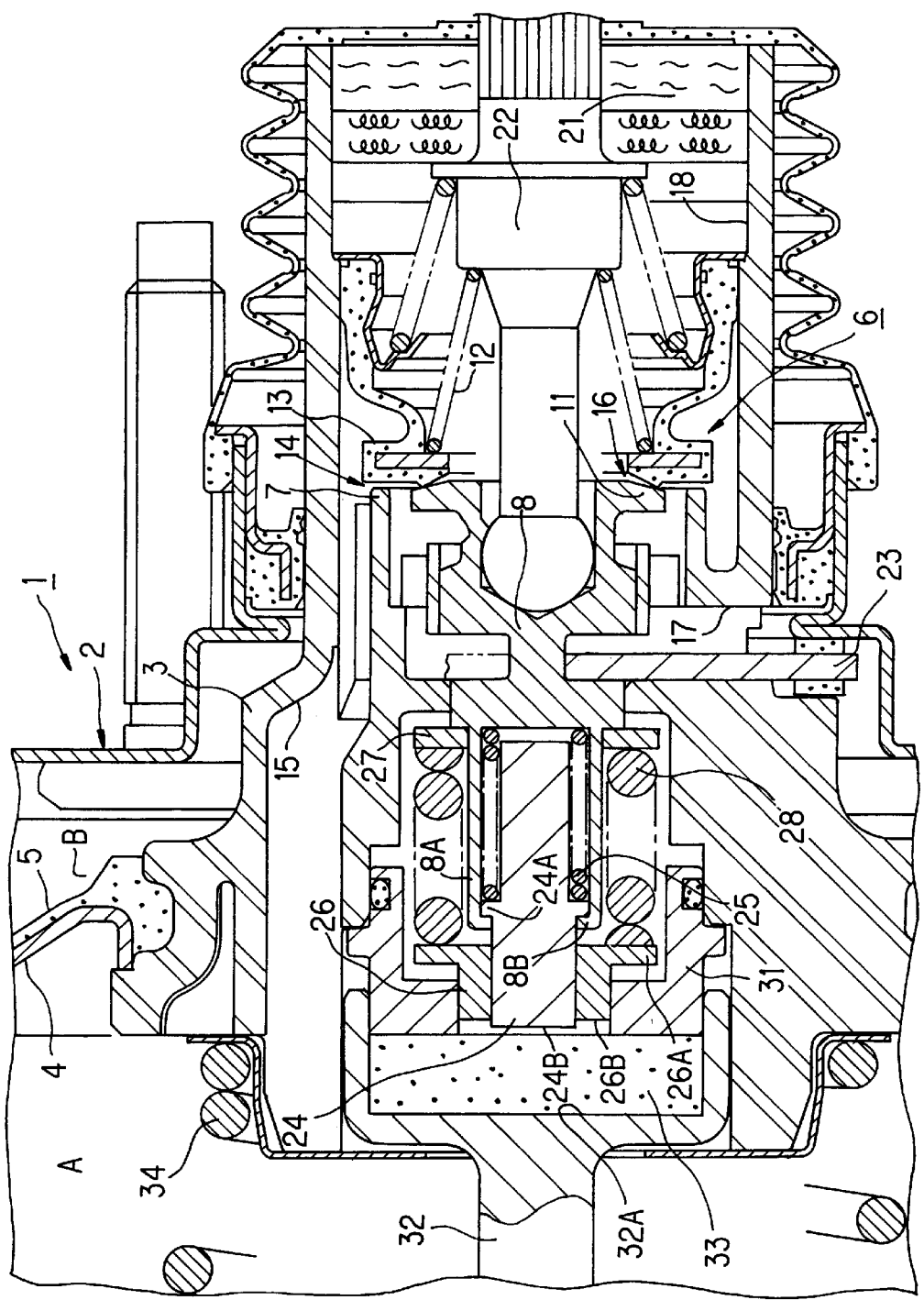
FIG. 1 is a cross section of one embodiment of the invention.

Referring to the drawings, an embodiment of the invention will now be described. In FIG. 1, a brake booster 1 includes a shell 2, in which a substantially tubular valve body 3 is slidably disposed.

A dish-shaped power piston 4 is mounted around the outer periphery of the valve body 3, and a diaphragm 5, formed of rubber, is applied to the back surface of the power piston 4. The diaphragm 5 partitions the interior of the shell 2 into a forwardly located constant pressure chamber A and a rearwardly located variable pressure chamber B.

A valve mechanism 6, which is known in itself, is disposed in the valve body 3 for switching a fluid circuit between the constant pressure chamber A and the variable pressure chamber B. The valve mechanism 6 comprises an annular, first valve seat 7 formed on the valve body 3, a valve plunger 8 slidably disposed in the valve body 3 at a location radially inward of the first valve seat 7, an annular, second valve seat 11 formed on a rear end of the valve plunger 8, and a valve element 13 which is urged by a spring 12 from right, as viewed in FIG. 1, to be seated upon the both valve seats 7 and 11.

A combination of the first valve seat 7 and an annular seat area on the valve element 13 which moves into engagement with or disengagement from first valve seat 7 defines a vacuum valve 14. A space located radially outward of the vacuum valve 14 communicates with the constant pressure chamber A through an axial constant pressure passage 15 formed in the valve body 3. The constant pressure chamber A communicates with an intake manifold through a tubing, not shown, mounted on the front wall of the shell 2 for introducing a negative pressure.

On the other hand, a combination of the second valve seat 11 and an annular seat area on the valve element 13 which moves into engagement with or disengagement from the second valve seat defines an atmosphere valve 16. A space located intermediate between or inward of the vacuum valve 14 and outward of the atmosphere valve 16 communicates with the variable pressure chamber B through a radial variable pressure passage 17 formed in the valve body 3.

Finally, a space located radially inward of the atmosphere valve 16 communicates with the atmosphere through an atmosphere passage 18 defined by the inner periphery of the valve body 3 and a filter 21 disposed therein.

The valve plunger 8 is slidably fitted into the inner periphery of the valve body 3, and has a rear end which is axially connected to an input shaft 22. The input shaft 22 is connected to a brake pedal, not shown. A key member 23 extends radially into the valve plunger 8 for engagement therewith, whereby a withdrawal of the valve plunger 8 from the inner periphery of the valve body 3 in a rearward direction is prevented.

In the present embodiment, a front portion of the valve plunger and an arrangement associated therewith are improved to permit the booster ratio to be changed in two stages while reducing the hysteresis in a region of a greater depression of the brake pedal to be substantially null.

Specifically, a front portion of the valve plunger 8 includes a cylindrical stowage 8A, in which an axially rear portion of a first plunger plate 24 in the form of a circular rod is slidably fitted.

A front end of the stowage 8A is folded radially inward to provide a stop 8B, while the first plunger plate 24 is formed with an annular projection 24A toward its axial center.

A first spring 25 which is charged to a given load extends between the annular projection 24A and its opposing bottom of the stowage 8A. Consequently, the first plunger plate 24 is normally urged forwardly relative to the valve plunger 8, and in the inoperative condition of the brake booster 1 shown in FIG. 1, the first plunger plate 24 is maintained at its advanced end position where the annular projection 24A abuts against the stop 8B. At this time, the rear end face of the first plunger plate 24 and the opposing bottom of the stowage 8A are spaced apart. Under this condition, the outer periphery of the first plunger plate 24 which is disposed forwardly of the annular projection 24A projects forwardly of the stowage 8A.

An annular, second plunger plate 26 is slidably fitted around the outer periphery of the fist plunger plate 24 toward its front end. The rear end of the second plunger plate 26 has an outer periphery, which defines a radially outwardly extending flange 26A. A second spring 28 is disposed between the flange 26A and a ring 27 which is fitted around the outer periphery of the valve plunger 8.

The second spring 28 has a spring constant which is greater than the spring constant of the first spring 25 which is disposed within the stowage 8A, and is interposed between the flange 26A and the ring 27 in its natural or axially non-compressed condition.

Under this condition, the front end face 24B of the first plunger plate 24 slightly projects through the second plunger plate 26, and accordingly, the front end face 24B of the first plunger plate 24 slightly projects forwardly of the front end face 26B of the second plunger plate 26. The magnitude of the projection is chosen to be less than the spacing between the rear end face of the first plunger plate 24 and its opposing bottom of the stowage 8A in the inoperative condition of the brake booster 1 shown in Fig. 1.

Also under this condition, a clearance is maintained between the rear end face of the second plunger plate 26 and the stop 8B of the stowage 8A.

A stepped sleeve 31 having an inner periphery of a reduced diameter toward its rear end is disposed in surrounding relationship with the both plunger plates 24, 26, and the outer periphery of the stepped sleeves 31 is fitted, at its rear end, into the inner periphery of the valve body 3 while maintaining a hermetic seal. The outer periphery of the second plunger plate 26 toward its front end is slidably fitted, from the rear side, into the inner periphery of the stepped sleeve 31 toward its front end. It is to be understood that the stepped sleeve 31 substantially defines part of the valve body.

An output shaft 32, which is known in itself, is disposed within the constant pressure chamber A, and has a rear end in which a recess 32A is formed to be slidably fitted around the outer periphery of the stepped sleeve 31. The recess 32A of the output shaft 32 contains a reaction disc 33, which is interposed between the bottom of the recess 32A and the front end face of the stepped sleeve 31.

The distal end (or front end) of the output shaft 32 projects externally by extending through the front axial portion of the shell 2 for connection with a piston of a master cylinder, not shown.

A return spring 34 is disposed between the front wall of the shell 2 and the valve body 3 for normally maintaining the power piston 4, the valve body 3 and the like in their inoperative positions shown.

In the inoperative condition, the key member 23 is disposed in abutment against the internal wall surface of the shell 2 to restrict a free movement to the right of the valve plunger 8 relative to the valve body 3, so that a switching operation within the fluid circuit takes place immediately by the valve mechanism 7 whenever the input shaft 22 and the valve plunger 8 are operated for the next time.

In the inoperative condition of the brake booster 1, the front end faces 24B, 26B of the both plunger plates 24, 26 are located slightly rearward of the front end face of the stepped sleeve 31, and thus are slightly spaced from the reaction disc 33. The front end face 24B of the first plunger plate 24 projects slightly forwardly of the front end face 26B of the second plunger plate 26. At this time, the second spring 28 is not compressed, but only functions as a spacer to keep the second plunger plate 26 spaced from the front end (stop 8B) of the valve plunger 8. Accordingly, the flange 26A of the second plunger plate 26 is positioned intermediate the stop 8B of the valve plunger 8 and the stepped end face of the stepped sleeve 31.

In the inoperative condition of the brake booster 1, the vacuum valve 14 is opened while the atmosphere valve 16 is closed. Accordingly, a negative pressure is introduced into the constant pressure chamber A and the variable pressure chamber B.

Operation

In the described arrangement, when a brake pedal, not shown is depressed under the inoperative condition of the brake booster 1 as shown in FIG. 1, the input shaft 22 and the valve plunger 8 are driven forward, thus opening the atmosphere valve 16 while closing the vacuum valve 14. This introduces the atmosphere into the variable pressure chamber B, actuating the brake booster 1.

Figure 2:
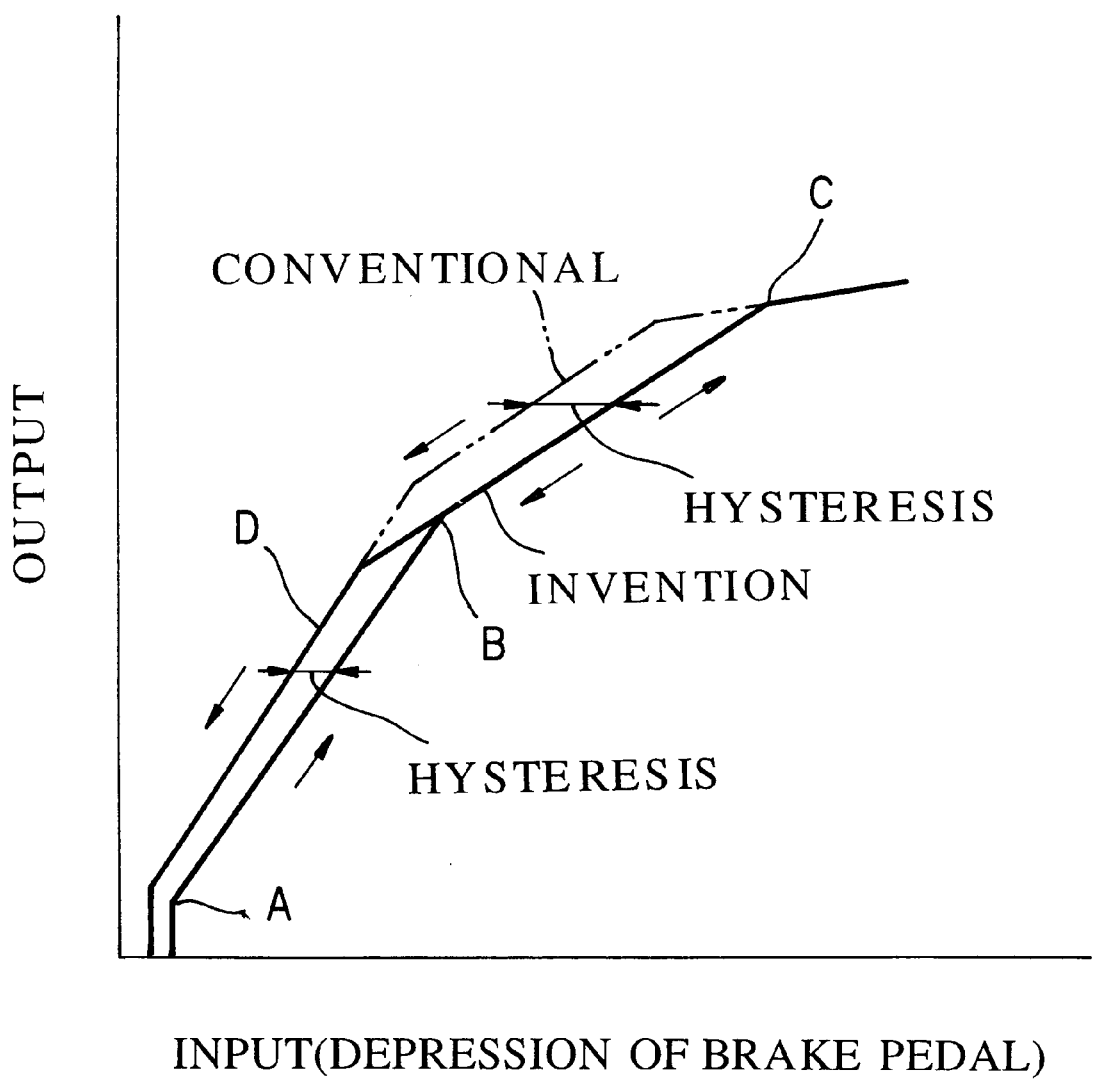
FIG. 2 graphically shows the characteristic diagrams of the brake booster shown in FIG. 1 and of a conventional booster.

A reaction from an output, which acts upon the output shaft 32, causes the reaction disc 33 to bulge rearward and to abut against the front end face 24B of the first plunger plate 24. This corresponds to point A shown in the graph of FIG. 2, and is commonly referred to as "jumping". A booster ratio at the jumping point can be described as (S1+S2)/S2 where S1 represents an area of an end face of the stepped sleeve 31 which abuts against the reaction disc 33, and S2 represents an area of the front end face 24B of the first plunger plate 24. Subsequently, the output increases with such booster ration up to point B.

Subsequently, as the depression (input) of the brake pedal increase to cause a further bulging rearward of the reaction disc 33, the first spring 25 is compressed, and the first plunger plate 24 retracts rearward relative to the stowage 8A.

Consequently, the front end face 24B of the first plunger plate 24 lies flush with the front end face 26B of the second plunger plate 26, and accordingly, the reaction disc 33 abuts against the front end faces 24B, 26B of the both members 24, 26. This corresponds to point B shown in FIG. 2.

Subsequent to point B, the booster ratio becomes reduced as compared with the preceding booster ratio. A mathematical expression for the booster ratio from point B to a full load point C can be given by (S1+S2+S3)/(S2+S3) where S3 represents an area of the end face 26B of the second plunger plate 26 which is abutted by the reaction disc 33, S1 an area of the front end face of the stepped sleeve 31 which is abutted by the reaction disc 33 and S2 an area of the end face 24B of the first plunger plate 24.

Since S2<(S2+S3), it follows that the booster ratio subsequent to point B is reduced than the booster ratio which prevails in a region from point A to point B. Accordingly, a brake reaction which is transmitted to a driver will be sensed small in a region from point A to point B, and will be sensed to be greater than before in a region which follows point B.

Subsequent to the full load point C, the output increases with a booster ratio of unity, and accordingly, a brake reaction which is transmitted to a driver subsequent to the full load point C will be sensed to be greater than it was before the full load point C.

In this manner, in the present embodiment, the booster ratio can be changed in two stages from the actuation of the brake booster 1 to the full load point C. Specifically, in a region of a smaller depression of the brake pedal as illustrated from point A to point B immediately after the actuation, a brake reaction of a small magnitude is transmitted to a driver, while a greater brake reaction will be transmitted to a driver in a region of a greater depression of the brake pedal as illustrated from point B to point C, subsequently transitioning to the full load point C where the brake reaction is at maximum.

Accordingly, it is possible to transmit a brake reaction which gives a sense of security to the driver in a later region where the output continues increasing while allowing a variation in the brake output from the actuation of the brake booster to the full load point to be recognized as a smooth change by the driver.

In a region where the booster ratio is reduced and the depression or input to the brake pedal is greater, if the brake pedal is released under the servo balance condition where the vacuum valve 14 and the atmosphere valve 16 are both closed, the opening of the vacuum valve 14 immediately results in a reduction in the output. However, as mentioned previously, under this condition, the reaction disc 33 is in abutment against the front end faces 24B, 26B of the both plungers 24, 26, and a brake reaction is transmitted through the second spring 28 and the first spring 25 to the valve plunger 8 and the input shaft 22. Accordingly, there is no change in the input until the reaction disc 33 which has once bulged is restored forwardly even though there occurs a reduction in the output immediately as mentioned above.

This means that in a region of a reduced booster ratio from point B to point C, the relationship between the input and the output remains substantially the same when the brake pedal is depressed and when it is released, such relationship being indicated by a rectilinear line joining the points B and C. In other words, according to the present embodiment, the hysteresis which signifies a difference in the input for an equal output is substantially null in the region from point B to point C.

In contradistinction to the embodiment described above, in a conventional arrangement as mentioned above, in a region of a reduced booster ratio as represented by a range from point B to point C, if a brake pedal is released under the servo balance condition, the output will be reduced as indicated by phantom lines. Thus, it will be seen that the hysteresis exists not only in a region from point A to point B of a greater booster ratio, but also in a region from point B to point C of a reduced booster ratio in the conventional arrangement. As a consequence, with the prior art construction as mentioned, an uncomfortable brake controllability in a region from point B to point C of a greater depression has been pointed out.

However, by contrast, according to the present embodiment, the hysteresis can be substantially nullified in a region of a greater depression from point B to point C, thus allowing the brake controllability to be improved.

It is to be noted that when the brake pedal is released in a region (from point A to point B) of a reduced depression and exhibiting a higher booster ratio, the output is reduced according to a rectilinear line D in the similar manner as in the prior art. In other words, in the region from point A to point B, the hysteresis occurs in the present embodiment in the similar manner as in the prior art.

While the invention has been described above in connection with a preferred embodiment thereof, it should be understood that a number of changes, modifications and substitutions therein are possible from the above disclosure without departing from the spirit and the scope of the invention defined by the appended claims.

What is claimed is:

1. A brake booster including a valve body slidably disposed in a shell, a valve plunger slidably fitted into the valve body and mechanically coupled to an input shaft for movement therewith, a first plunger plate slidably fitted into a front tubular portion of the valve plunger, a first spring for urging the first plunger plate forward relative to the valve plunger, and a reaction disc interposed between one end of an output shaft and an end face of the valve body for transmitting a reaction which is acting upon an output shaft through the first plunger plate and the first spring to the valve plunger and the input shaft;

characterized by an annular, second plunger plate slidably fitted around an outer periphery of the first plunger plate toward its front end, and a second spring having a greater spring constant than the first spring and disposed between the second plunger plate and the valve plunger, a front end face of the second plunger plate being disposed rearward of a front end face of the first plunger plate in an inoperative condition of the brake booster, the arrangement being such that as the brake booster is actuated, in a region of a reduced depression of a brake pedal, the reaction disc is brought into abutment against the front end face of the first plunger plate so that a reaction which is acting upon the output shaft is transmitted through the first plunger plate and the first spring to the valve plunger while in a region of a greater depression of the brake pedal, the reaction disc is brought into abutment against the front end faces of the both plunger plates so that a reaction which is acting upon the output shaft is transmitted through the first spring and the second spring to the valve plunger.

2. A brake booster according to claim 1 in which the tubular portion of the valve plunger is formed at its front end with a stop which extends radially inward, the first plunger plate which is disposed within the tubular portion of the valve plunger being formed with a flange around its outer periphery toward its axial center, the first spring being disposed between the flange and the bottom of the tubular portion, the second plunger plate having a flange formed around its outer periphery at its rear end which extends radially outward, a ring being mounted around an outer periphery of the tubular portion of the valve plunger, the second spring being disposed between the ring and the flange of the second plunger plate, the arrangement being such that in the inoperative condition of the brake booster, the flange of the first plunger plate abuts against the stop on the valve plunger from the rear side while the front end of the second spring, in its natural condition, is located forwardly of the stop on the valve plunger, whereby the rear end face of the second plunger plate is spaced from the stop on the valve plunger.

* * * * *